United States Patent
Lagassey

(10) Patent No.: US 8,195,457 B1
(45) Date of Patent: Jun. 5, 2012

(54) SYSTEM AND METHOD FOR AUTOMATICALLY SENDING TEXT OF SPOKEN MESSAGES IN VOICE CONVERSATIONS WITH VOICE OVER IP SOFTWARE

(75) Inventor: Paul J. Lagassey, Vero Beach, FL (US)

(73) Assignee: Cousins Intellectual Properties, LLC, Vero Beach, FL (US)

( * ) Notice: Subject to any disclaimer, the term of this patent is extended or adjusted under 35 U.S.C. 154(b) by 1186 days.

(21) Appl. No.: 11/970,392

(22) Filed: Jan. 7, 2008

Related U.S. Application Data

(60) Provisional application No. 60/883,757, filed on Jan. 5, 2007.

(51) Int. Cl.
  *G06F 17/27* (2006.01)
  *G10L 15/00* (2006.01)
(52) U.S. Cl. ............ 704/235; 704/9; 704/231; 704/270
(58) Field of Classification Search ............... 704/9, 231, 704/235, 270
See application file for complete search history.

(56) References Cited

U.S. PATENT DOCUMENTS

| | | | |
|---|---|---|---|
| 6,141,341 A * | 10/2000 | Jones et al. | 370/352 |
| 6,404,764 B1 * | 6/2002 | Jones et al. | 370/352 |
| 6,553,100 B1 * | 4/2003 | Chen et al. | 379/37 |
| 7,095,747 B2 * | 8/2006 | Sarmiento et al. | 370/401 |
| 2003/0125955 A1 * | 7/2003 | Arnold et al. | 704/270.1 |
| 2004/0019638 A1 * | 1/2004 | Makagon et al. | 709/204 |
| 2004/0125924 A1 * | 7/2004 | McMullin et al. | 379/88.19 |
| 2006/0276230 A1 * | 12/2006 | McConnell | 455/563 |
| 2007/0016344 A1 * | 1/2007 | Stefani | 701/3 |
| 2007/0055517 A1 * | 3/2007 | Spector | 704/246 |
| 2007/0208570 A1 * | 9/2007 | Bhardwaj et al. | 704/270.1 |
| 2008/0059198 A1 * | 3/2008 | Maislos et al. | 704/273 |
| 2008/0071544 A1 * | 3/2008 | Beaufays et al. | 704/270.1 |
| 2008/0195394 A1 * | 8/2008 | Francioli | 704/271 |
| 2008/0276003 A1 * | 11/2008 | Dudley et al. | 709/242 |

* cited by examiner

*Primary Examiner* — Justin Rider
(74) *Attorney, Agent, or Firm* — Steven M. Hoffberg; Ostrolenk Faber LLP

(57) ABSTRACT

A communications system and method, comprising means for receiving a speech input from a user; converting the received speech input to a text representation thereof; communicating the text representation remotely from the user; and at least one of reproducing the speech input and displaying the text representation remotely from the user; and converting the text representation into speech remotely from the user.

21 Claims, No Drawings

SYSTEM AND METHOD FOR AUTOMATICALLY SENDING TEXT OF SPOKEN MESSAGES IN VOICE CONVERSATIONS WITH VOICE OVER IP SOFTWARE

FIELD OF THE INVENTION

The present invention relates to the field of voice communication systems, and more particularly to computer telephone integrated systems supporting data communications functions.

BACKGROUND OF THE INVENTION

Text chat systems are well known, and include AOL Instant Messenger (AIM), Skype, GoogleTalk, MSN Messenger, Yahoo Messenger, ICQ, etc. Many of these applications are speech enabled to provide a centralized or peer-to-peer Voice over IP functionality.

Tellme Networks, Inc. (Mountain View, Calif.), for example, provides a VoiceXML interface for Skype®, and provides voice recognition functionality. Likewise, the Wishcom Open Message platform also permits integration of voice recognition into Skype.

DESCRIPTION OF THE INVENTION

The quality of a voice over IP conversation may be impacted by bandwidth issues and/or distance, making it difficult for at least one party to the conversation to hear clearly what another party is saying. Under these circumstances, receiving a text transcript of the other party's speech can help the receiving party(s) fill in the gaps in which the conversation cannot be clearly understood. The text transcript may be read to the receiving party by a text to speech engine. The text transcript may be stored in an archive to efficiently represent the conversation.

The transcript may include one or all parties to the conversation.

Likewise, by transporting the text transcript contemporaneously with the speech, a speech synthesizer may be able to fill in gaps to make the received speech more intelligible. Similarly, a text transcript may be translated from one language or dialect to another, and/or change a regional accent.

In its preferred embodiment, the system and method described herein uses a text to speech engine and a speech recognition software, capable of passing dictation and commands to other applications. When the speech recognition software is activated, and the target application is selected, in this case a voice over IP software application (preferably with an integrated chat or file transfer system) such as Skype, GoogleTalk, or Windows Messenger, the user receives or initiates a voice conversation. The speech recognition program sends the dictation transcript corresponding to the user's conversation to the message dialog interface (the area where a user may type messages) of the voice over IP application, and periodically at predetermined intervals or upon command from the user, sends a command to the voice over IP application to send the contents of its message dialog. The other party(s) to the conversation then receive a text transcript of the spoken words. The text transfer may also be in real time, either through the voice over IP application, or though a separate application or protocol. Indeed, the voice over IP protocol packets typically support a message payload, and therefore the accompanying text may be included within the same packets. In alternate embodiments, the speech functionality may be provided by another application or through operating system functionality.

If desired, the speech recognition program can be provided as a trial or given to end users for free or for a nominal charge. When in trial mode, the send message command embeds a text message at the end of the dictation before passing the send command to the voice chat or voice over IP application. This embedded message can be an advertisement promoting the program or a paid advertisement which generates revenue for the developer.

One embodiment of the present invention is a speech recognition application entitled SpeakToText™ (Coolsoft LLC. Vero Beach Fla.), which is packaged with the redistributable of the Microsoft SAPI 5.1 Speech Recognition Engine. When SpeakToText™ is started and placed in Advanced mode, dictation follows placement of the cursor in the text dialog of other applications. When SpeakToText is running in advanced mode, and the cursor is placed in the message dialog of a voice chat or voice over IP application, the spoken conversation is dictated into the message dialog. When the SpeakToText™ autosend feature is enabled, a send message command is automatically send to the chat or voice over IP application every 30 seconds, causing it to send the contents of its message dialog representing text of the spoken conversation. This is text is then received by the other party(s) to the conversation. As described above, when SpeakToText™ is in trial mode and this autosend feature is used, it embeds a text message at the end of the dictation before issuing the send message command.

In other embodiments, a program with a text to speech engine on the receiving party(s) computer can be used to read the text of the conversation. The voice over IP software or another program can be used to analyze the conversation and communicate with the voice over IP software of other user(s) in the conversation to assist in enhancing the voice portion of the conversation. This technique may be especially useful with impaired or limited bandwidth communications.

In other alternate embodiments, a separate program or the voice over IP software on the receiving computer(s) may analyze the voice and text conversation to present a synthesized composite of the received conversation so as to compensate for speech recognition errors on the speaker's computer and poor audio reception on the receiving computer(s).

In further alternate embodiments, the voice over IP software has at least one of the speech to text engine and the text to speech engine so a separate speech recognition program is not required.

It will be appreciated that the above described methods may be varied in many ways, including, changing the order of steps, and/or performing a plurality of steps concurrently. It should also be appreciated that the above described description of methods and apparatus are to be interpreted as including apparatus for carrying out the methods, and methods of using the apparatus, and computer software for implementing the various automated control methods on a general purpose or specialized computer system, of any type as well known to a person or ordinary skill, and which need not be described in detail herein for enabling a person of ordinary skill to practice the invention, since such a person is well versed in industrial and control computers, their programming, and integration into an operating system. For the main embodiments of the invention, the particular selection of type and model is not critical, though where specifically identified, this may be relevant. The present invention has been described using detailed descriptions of embodiments thereof that are provided by way of example and are not intended to limit the scope of the invention. No limitation, in general, or by way of words such as "may", "should", "preferably", "must", or other term denoting a degree of importance or motivation, should be considered as a limitation on the scope of the claims or their equivalents unless expressly present in such claim as a literal limitation on its scope. It should be understood that features and/or steps described with respect to one embodiment may be used with other embodiments and that not all embodiments of the invention have all of the features and/or steps shown in a particular figure or described with respect to one of the embodiments. That is, the disclosure should be considered combinatorially complete, with each embodiment of each element considered disclosed in conjunction with each other embodiment of each element (and indeed in various combinations of compatible implementations of variations in the same element).

Variations of embodiments described will occur to persons of the art. Furthermore, the terms "comprise," "include," "have" and their conjugates, shall mean, when used in the claims, "including but not necessarily limited to." Each element present in the claims in the singular shall mean one or more element as claimed, and when an option is provided for one or more of a group, it shall be interpreted to mean that the claim requires only one member selected from the various options, and shall not require one of each option. The abstract shall not be interpreted as limiting on the scope of the application or claims. It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

What is claimed is:

1. A communications method, comprising:
   receiving a conversational speech input from a first user;
   converting the received speech input to a text representation thereof using an automated processor;
   communicating the text representation and speech input remotely from the first user to a second user in real time, as part of a conversation; and
   automatically reproducing the speech input and displaying the text representation in real time to the second user through an automated interface device,
   wherein the speech input is received by a speech application executing on the automated processor, the speech application further comprising a text dialog interface, further comprising the step of transferring the text representation to the text dialog interface and communicating the text representation by the speech application from the text dial;
   wherein the text dialog interface is in a separate application executing on the automated processor and the speech application transfers the text representation to said text dialog interface; and
   wherein the speech application receives the speech input as dictation and commands, and sends at least one command derived from the speech input to said separate application.

2. The method according to claim 1, wherein the speech input is reproduced remotely from the first user.

3. The method according to claim 1, wherein the text representation is converted into speech remotely from the first user.

4. The method according to claim 1, wherein said communicating comprises conveying the received speech as voice over internet protocol packets to a remote location.

5. The method according to claim 4, wherein the text representation is communicated in the voice over internet protocol packets.

6. The method according to claim 1, wherein the second user is presented with both the reproduced speech input and the converted text representation communicated together as IP packets through the Internet.

7. The method according to claim 1, wherein the reproduced speech input is at least partially synthesized based on the text representation.

8. The method according to claim 1, wherein text representation is stored as a transcript.

9. The method according to claim 1, wherein the speech input is received by a speech-enabled application executing on the automated processor, the speech-enabled application further comprising a digital file transfer interface, further comprising the step of transferring the text representation through the digital file transfer interface and automatically presenting the text representation so transferred to the second user.

10. A communications apparatus, comprising:
    a speech input for receiving conversational speech information from a first user;
    a speech to text process for converting the received speech information to a text representation thereof;
    a communications interface for communicating the text representation and the speech input remotely from the user as part of a real time conversation with a second user; and
    an audio interface configured to reproduce a second speech input and a visual interface displaying the text representation from the second user to the first user.

11. The apparatus according to claim 10, wherein the speech input is reproduced remotely from the first user.

12. The apparatus according to claim 10, wherein the text representation is converted into speech remotely from the first user.

13. The apparatus according to claim 10, wherein said communicating comprises conveying the received speech as voice over internet protocol packets to a remote location.

14. The apparatus according to claim 13, wherein the text representation is communicated in the voice over internet protocol packets.

15. The apparatus according to claim 10, wherein the speech input is received by a speech application, the speech application further comprising a text dialog interface, the text representation being transferred to the text dialog interface and the text representation being communicated by the speech application from the text dialog interface.

16. The apparatus according to claim 15, wherein the text dialog interface is in a separate application and the speech application transfers the text representation to said text dialog interface.

17. The method according to claim 16, wherein the speech application is configured to receive the speech information as dictation and commands, and to send at least one command derived from the speech information to said separate application.

18. The apparatus according to claim 10, wherein the first user is presented both the reproduced speech input and the converted text representation from the second user.

19. The apparatus according to claim 18, wherein the reproduced speech input is at least partially synthesized based on the text representation.

20. The apparatus according to claim 10, wherein the speech input is received by a speech-enabled application, the speech-enabled application further comprising a digital file transfer interface, the text representation being transferred through the digital file transfer interface and automatically presented to the second user.

21. A communications apparatus, comprising:
- a speech input for receiving speech information from a user;
- a speech to text process for converting the received speech information to a text representation thereof;
- a communications interface for communicating the text representation remotely from the user and for receiving a text representation of speech;
- a text to speech interface configured to receive the text representation of speech, and to convert at least a portion of the text representation of speech into speech; and
- an automated processor configured to distinguish between a linguistic communication and a command in the received text representation of speech, and to selectively process and execute the command in an application separate from the text to speech interface.

* * * * *

UNITED STATES PATENT AND TRADEMARK OFFICE
CERTIFICATE OF CORRECTION

| | | |
|---|---|---|
| PATENT NO. | : 8,195,457 B1 | Page 1 of 1 |
| APPLICATION NO. | : 11/970392 | |
| DATED | : June 5, 2012 | |
| INVENTOR(S) | : Paul Lagassey | |

It is certified that error appears in the above-identified patent and that said Letters Patent is hereby corrected as shown below:

Title page, item [60] should read:

The present application claims benefit of priority from U.S. Provisional Patent Application No. 60/883,757, filed January 5, 2007.

Signed and Sealed this
Eighteenth Day of December, 2012

David J. Kappos
*Director of the United States Patent and Trademark Office*